United States Patent [19]

Stromberg

[11] Patent Number: 5,307,901
[45] Date of Patent: May 3, 1994

[54] INNER SPINDLE BEARING GREASER TOOL

[76] Inventor: Richard J. Stromberg, 27 Chandler St., Tomahawk, Wis. 54487

[21] Appl. No.: 40,606

[22] Filed: Mar. 31, 1993

[51] Int. Cl.⁵ .............................................. F16C 1/24
[52] U.S. Cl. ................... 184/5.1; 184/105.1; 384/372
[58] Field of Search ............... 184/5.1, 6, 105.1, 27.1; 384/397, 372

[56] References Cited

U.S. PATENT DOCUMENTS

| | | | |
|---|---|---|---|
| 2,438,128 | 3/1948 | Poyner | 184/5.1 |
| 2,514,799 | 7/1950 | Rubertino et al. | 184/5.1 |
| 4,058,185 | 11/1977 | Ploeger . | |
| 4,106,816 | 8/1978 | August . | |
| 4,932,499 | 6/1990 | Covert et al. . | |
| 5,109,955 | 5/1992 | Clark . | |

FOREIGN PATENT DOCUMENTS

| | | | |
|---|---|---|---|
| 0165517 | 10/1955 | Australia | 184/5.1 |
| 0076794 | 6/1981 | Japan | 184/5.1 |

*Primary Examiner*—Thomas E. Denion
*Attorney, Agent, or Firm*—Jacobson, Price, Holman & Stern

[57] ABSTRACT

A simple sleeve internally threaded at one end, closed at its other end and provided with a Zerk fitting opening therethrough is provided and may be threadedly engaged over the externally threaded outer end of the tubular spindle of one of the front wheels of a four wheel drive vehicle interiorly of the wheel mounting hub and exteriorly of the hub retaining nuts after the removal of the usual selectively engagable and disengagable drive connection assembly structure mounted within the hub exteriorly of the hub bearing adjusting nuts. The sleeve may be utilized to forcibly inject grease inwardly between the drive axle and the interior of the spindle for greasing the inner axle bearings at the inner end of the tubular spindle and expressing contaminants including moisture and dirt from the spindle bearings through the usual grease seals associated with the spindle bearings.

6 Claims, 1 Drawing Sheet

INNER SPINDLE BEARING GREASER TOOL

BACKGROUND OF THE INVENTION

1. Field of the Invention

This invention relates to a tool by which lubrication grease may be forced inwardly between the drive axle and the tubular spindle of a front drive wheel inwardly along the drive axle and spindle for lubricating the bearings journaling the inner end of the drive axle from the interior of the spindle, independent of removal of the wheel hub journaled on the exterior of the tubular spindle and in a manner requiring only the relatively ready removal of the selectively engagable and disengagable drive connection assembly means between the splined outer end of the drive axle and the inner splines of the hub outwardly of the axial load adjusting nuts for the hub bearings and merely by threading one open end of the sleeve over the threaded outer end of the spindle and forcing lubrication grease through the other end of the sleeve.

2. Description of Related Art

Various different forms of apparatuses heretofore have been provided for greasing wheel and hub bearings independent of complete disassembly thereof. Examples of these previously known devices are disclosed in U.S. Pat. Nos. 4,058,185, 4,106,816, 4,932,499 and 5,109,955. However, these previously known devices do not include the combination of structure of the instant invention wherein the inner needle bearings of the front wheel of a four wheel drive vehicle disposed between the inner end of the driving axle and the inner end of the tubular spindle may be lubricated in a manner which will also be effective to express dirt and moisture therefrom through the associated seal.

SUMMARY OF THE INVENTION

This invention relates to an extremely simple apparatus and method for lubricating and expressing moisture and dirt from the needle bearing between the inner axle end and inner tubular spindle end of the front wheel of a four wheel drive vehicle. The apparatus and method enable cleaning and lubrication of the bearings in question while requiring only ready removable of the drive connection assembly structure operatively connected between the splined outer end of the drive axle and the inner splines of the hub journaled on the tubular spindle.

The main object of this invention is to provide a method and apparatus for lubricating the inner needle bearings between the inner axle end and tubular spindle of a front wheel of a four wheel drive vehicle.

Another object of this invention is to provide a method and apparatus in accordance with the preceding object wherein the lubricating process carried out by the method and effected by proper usage of the tool will be capable of flushing moisture and dirt from the bearing being lubricated and expressing such moisture and dirt past the associated seal.

Another very important object of this invention is to provide a method and apparatus which may be carried out in a minimum of time and totally independent of removal and/or adjustment of the associated hub bearings.

A further object of this invention is to provide a method and apparatus which will enable the desired lubricating process to be carried out even by relatively inexperienced persons.

A final object of this invention to be specifically enumerated herein is to provide an apparatus which conforms to conventional forms of manufacture, is of simple construction and easy to use so as to provide a device that will be economical feasible and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
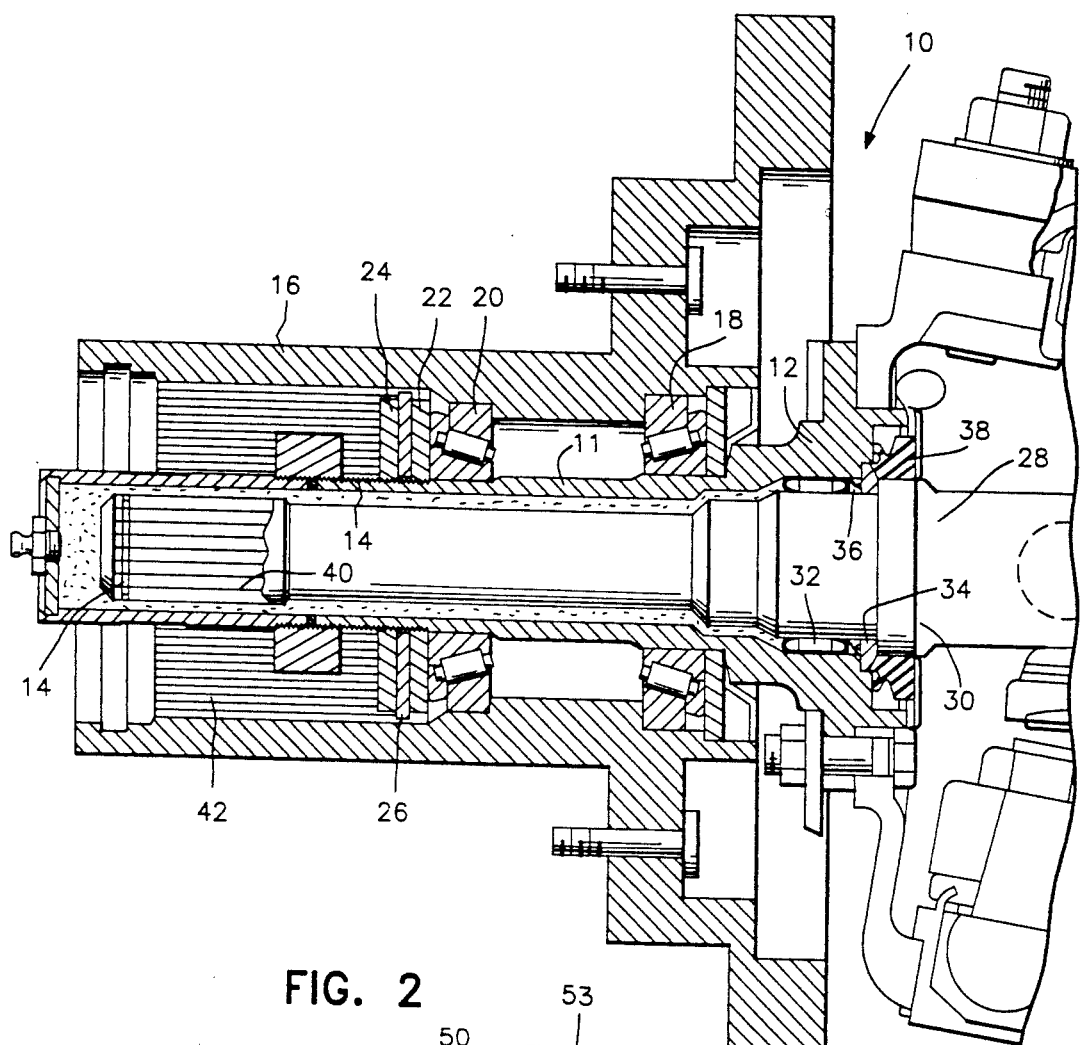
FIG. 1 is a fragmentary vertical sectional view of one of the front wheel journaling and driving mechanisms of a typical four wheel drive vehicle with the drive connection assembly structure operatively associated with the splined outer end of the drive axle and the splinded interior of the associated hub removed and the inner axle bearing lubricating tool of the instant invention in operative association with the threaded outer end of the spindle.
Figure 2:
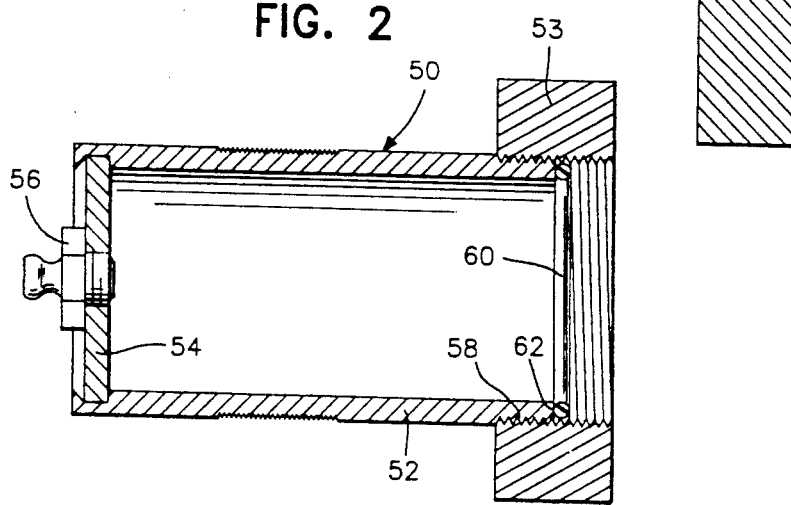
FIG. 2 is an enlarged longitudinal vertical sectional view of the tool.

Referring now more specifically to the drawings the numeral 10 generally designates a front wheel suspension assembly including various parts illustrated in section which may be considered as typical of Chevrolet K10, K20 pickup trucks, Chevrolet K5 Blazers, GMC K15, K25 pickups, GMC "Jimmy's", Chevrolet and GMC Suburbans, Dodge W100, W150 and W200 pickup trucks, Dodge Ram Chargers, Ford F150, F250 pickup trucks, Ford Ranger pickup trucks, Ford Bronco and Bronco II, Jeep Grand Wagoner, Jeep J10, J20 pickup trucks, International pickup trucks and International Scouts.

Such assemblies 10 include tubular spindles 11 including inner and outer ends 12 and 14, wheel mounting hubs 16 journaled on the exterior of the spindle and through the utilization of inner and outer bearings 18 and 20 having proper axial loading thereon developed by adjusting and lock nuts 22 and 24 threaded on the externally threaded outer end 14 of the spindle 11 and retained in adjusted position through the utilization of a locking washer 26 disposed between the nuts 22 and 24.

The tubular spindle 11 receives a corresponding drive axle therethrough with the inner end 30 of the drive axle journaled from the inner end 12 of the spindle 11 through the utilization of needle bearings 32, an abutment washer 34 and inner and outer seals 36 and 38 being interposed between the relatively rotatable inner ends 12 and 30 of the spindle 11 and axle 28.

The outer end of the drive axle 28 is splined as at 40 and the interior of the outer end of the hub 16 is splined as at 42. Further, the outer extremity of the splined portion of the axle 28 includes a snap ring groove 44 and the selectively engagable and disengagable drive connection assembly structure (not shown) usually operatively connected between the splines 40 and the splines 42 outwardly of the locking nut 24 have been removed, this structure being readily removable (usually through the removable of six or eight bolts and a snap ring and-/or a diametric pin.

The tool of the instant invention is referred to in general by the reference numeral 50 and includes a thin walled, long reach sleeve 52 closed on its outer end by an end wall 54, the wall 54 having a Zerk fitting 56 opening therethrough. The inner end of the sleeve 52 is externally threaded as at 58 an axial extent equal to approximately one-half the axial extent of a sleeve or nut 54 threaded on the threads 58. An 0-ring seal 60 is snugly received within the axial end of the sleeve or nut 53 and abuts the end surface 62 of the sleeve 52.

Thus, when the tool 50 is threaded onto the externally threaded outer end of the tubular spindle 11 and tightened thereon, the 0-ring seal 62 is axially clamped between the opposing end faces of the sleeve 52 and the spindle 11 and forms a fluid tight seal engagement therewith. Actually, the sleeve 52, at the end thereof remote from the end wall 54 could be of slightly greater wall thickness and equipped with a threaded counter bore in which the 0-ring seal 60 could be seated in lieu of providing the exterior of the sleeve 52 with the nut 53.

In any event, the needle bearings 32 may be flushed of contaminates and supplied with fresh lubricate merely by (1) quick removal of the drive connection assembly means hereinbefore referred to normally disposed outwardly of the locking nut 24 and selectively drivingly connecting the spline outer end of the axle 28 with the interior of the wheel mounting hub 16 and then (2) threadedly engaging the tool 50 with the externally threaded outer end of the spindle 11 and pressure injecting lubricant into the sleeve 52 through the Zerk fitting 56 until such time as lubricant is forced past the seal 36 and outwardly of the seal 38. Thereafter, the tool 50 is removed and the previously referred to selectively engagable and disengagable drive connection assembly means (not shown) is again inserted and secured within the hub 16 outwardly of the locking nut 24 for providing a disconnectable drive connection between the splined outer end of the axle 28 and the internally splined portion of the hub 16.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalence may be resorted to, falling within the scope of the invention.

What is claimed as new is s follows:

1. In combination, an inner spindle bearing greasing tool for the drive shaft of a front wheel driving axle of the type including a selectively engagable and disengagable drive connection assembly means between a splined outer end of the drive axle and an inner spline equipped hub journaled upon the exterior of a tubular spindle through which said axle is journaled, an inner bearing assembly disposed between the inner end of the axle and spindle, said spindle having a threaded outer extremity upon which adjusting and locking nuts for hub-to-spindle bearings are threaded inward of the outer extremity of said hub, the inner ends of the drive axle and spindle having seal means operatively associated therewith disposed inward of said inner bearing assembly, said tool including a thin walled, long reach sleeve closed at one end and having a grease fitting opening therethrough, the other end of said sleeve being insertable within said hub subsequent to removal of said drive connection assembly means and including internal thread means for threaded engagement over said threaded outer extremity of said tubular spindle.

2. The combination of claim 1 wherein said other end of said sleeve defines a threaded counter bore comprising said internal thread means and defines an inwardly projecting circumferential shoulder at the inner extremity of said counter bore, and annular seal means telescoped within said counter bore and seated against said shoulder for axial compression between said shoulder and the outer end of said spindle.

3. A tool for greasing the inner bearings of a front wheel drive axle journaled through a tubular spindle upon which an outer hub is journaled by bearings having the axial loading thereon adjusted by nut means threaded onto the exterior of said spindle outer end portion and wherein the outer ends of said spindle and hub are externally and internally splined, respectively, for coaction with selectively engageable and disengagable drive connection assembly means internally and externally spline engaged with said externally and internally splined spindle and hub, said tool comprising a thin walled, long reach sleeve closed at one end and having a grease fitting opening therethrough, the other of said sleeve being adapted to be threaded over said spindle outer end and including inwardly recessed ANNULAR seal means for sealed engagement with said spindle outer end.

4. The tool of claim 3 wherein said sleeve other end is externally threaded, and internally threaded sleeve partially threaded over said other end, said annular seal means being snugly received within said internally threaded sleeve and seated against the end face of said thin walled sleeve other end, said internally threaded sleeve being threadedly engagable over said spindle outer end with said annular seal means axially compressed between the outer end of said spindle and sleeve other end.

5. The method of greasing the inner bearings journaling the inner drive shaft end of a drive axle form a tubular spindle of a front wheel dive system wherein a wheel support hub is journaled externally on said tubular spindle by hub bearings whose axial loading is adjusted by an adjusting nut and a lock nut threaded on said spindle outwardly of said hub bearings and the outer end of said hub and spindle are internally and externally splined, and removable, externally and internally splined and selectively engageable and disengagable drive connection assembly means is operatively associated with the internal splines of said hub and external splines of said spindle outwardly of said nut means, said method including removing said drive connection assembly means, providing a thin walled sleeve open and internally threaded at one end, threading said one end of sad sleeve over said spindle outwardly of said nut means in sealed engagement therewith, and forcing grease through said sleeve from the other end thereof.

6. The method of claim 5 wherein said sleeve includes a second closed end having a grease fitting opening therethrough and the step of forcing grease through said sleeve includes introducing grease under pressure into said sleeve through said grease fitting.

* * * * *